MIXING CIRCUIT FOR TELEVISION CAMERAS

Filed Feb. 9, 1946 2 Sheets-Sheet 1

Salvatore R. Patremio INVENTOR

BY Charles W. Mortimer

MIXING CIRCUIT FOR TELEVISION CAMERAS

Filed Feb. 9, 1946 2 Sheets-Sheet 2

Salvatore R. Patremio INVENTOR

BY Charles W. Mortimer

Patented June 6, 1950 2,510,714

UNITED STATES PATENT OFFICE 2,510,714

MIXING CIRCUIT FOR TELEVISION CAMERAS

Salvatore Robert Patremio, Rochelle Park, N. J., assignor to Allen B. Du Mont Laboratories, Inc., Passaic, N. J., a corporation of Delaware Application February 9, 1946, Serial No. 646,626

1 Claim. (Cl. 178—7.1)

This invention relates to means for changing from one television camera to another in such a way that a video signal can be obtained from either camera, or a mixed video signal can be obtained from both.

In carrying out the invention provision is made to cause the video signal from one of the cameras to fade out gradually while the video signal from the other one comes on gradually. In this way pictures on receiving sets can be received from either camera and when the video signal from it is being faded out the video signal from the other one is gradually coming on so that the signals are blended during the change over time. During the change over time the video signal that is being transmitted gradually fades while the signal from the oncoming camera gradually increases until it is the entire video signal.

Figure 1A:
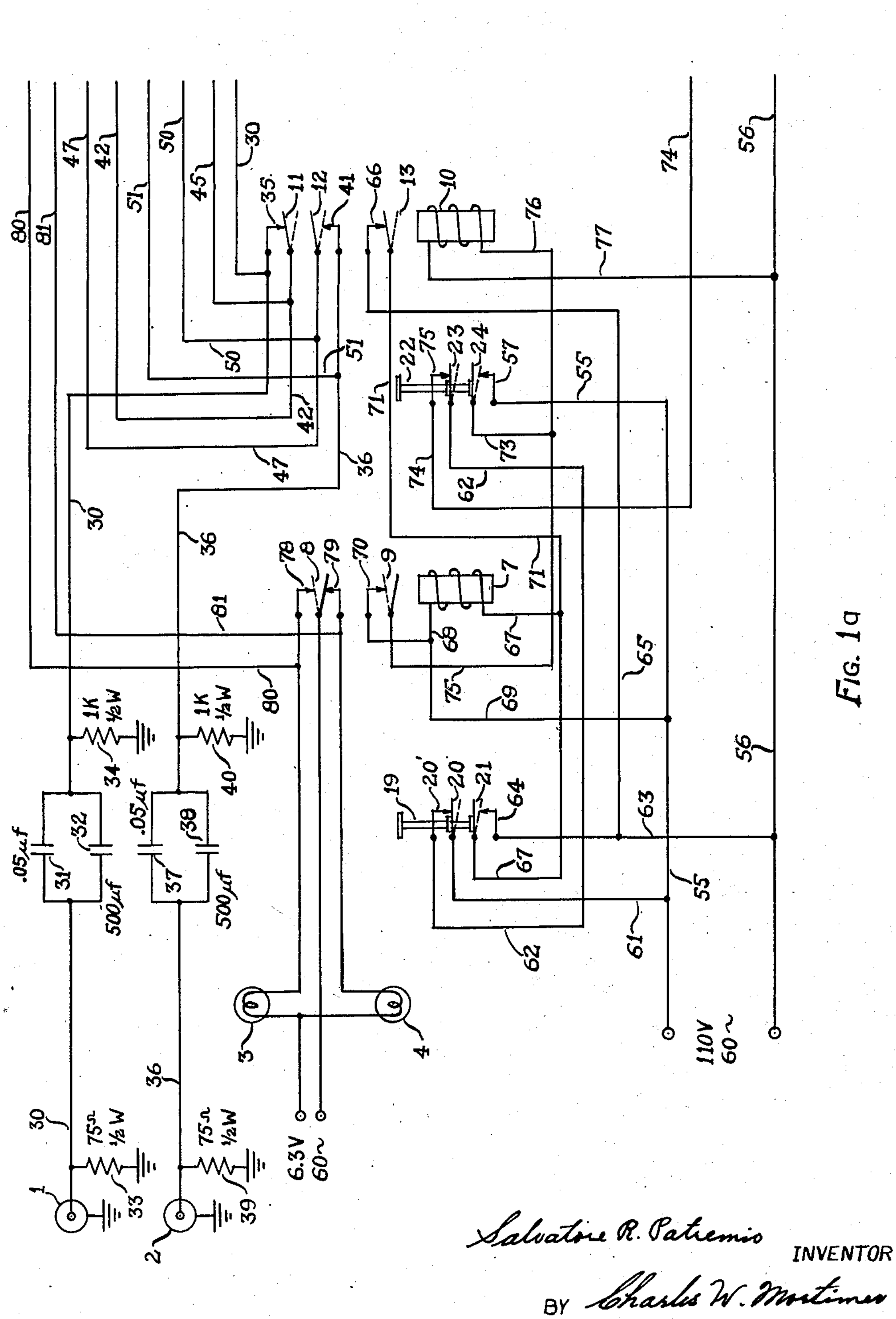
Figure 1B:
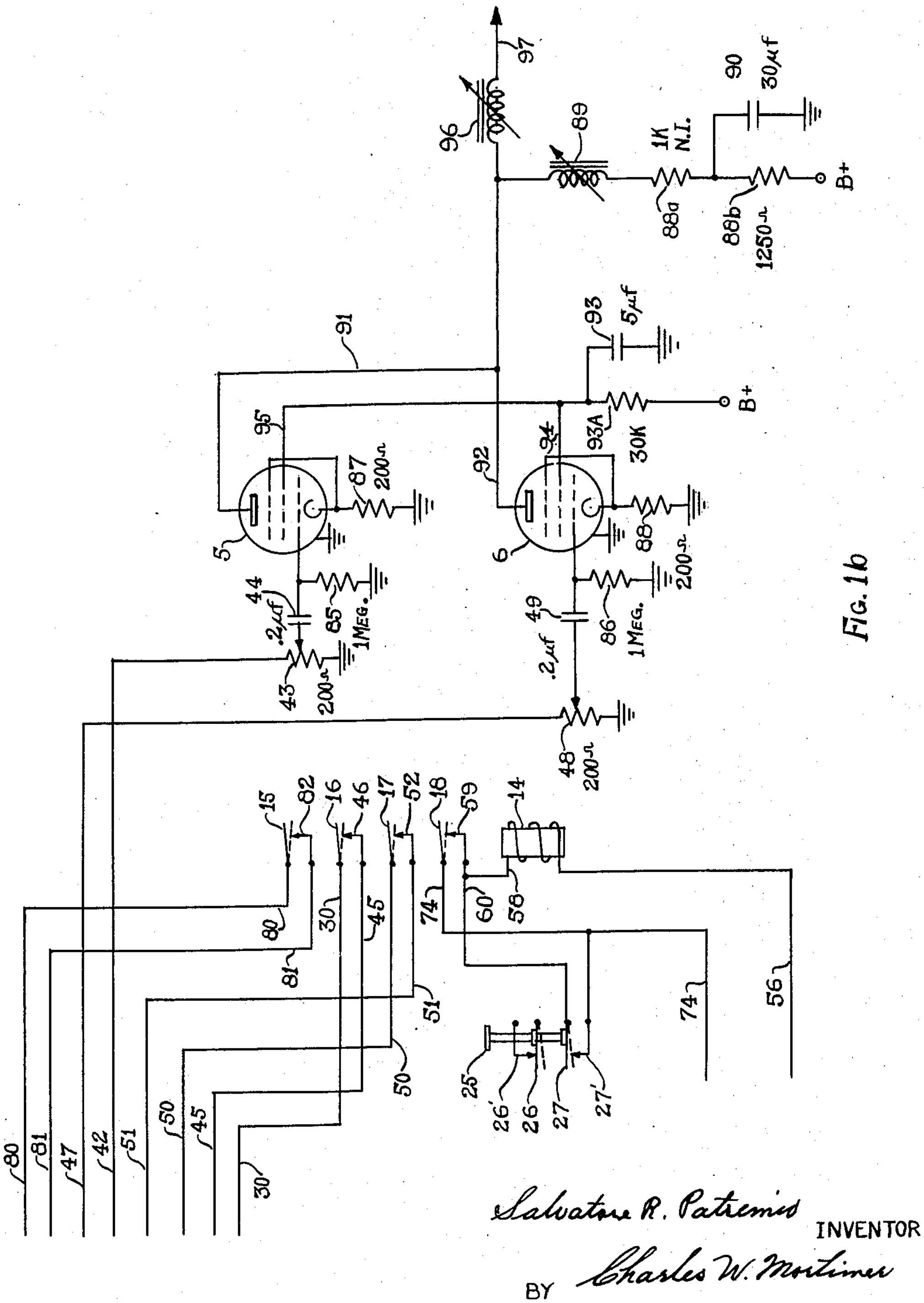

The invention may be understood from the description in connection with the accompanying drawings in which Figs. 1*a* and 1*b* show a diagram of connections showing how the invention can be carried out.

In the drawing, reference characters 1 and 2 indicate the coaxial inputs of two camera signals that may be used separately or in such a way that the video signals therefrom are blended or made to fade in and out with respect to each other. The indicating lights for the cameras are shown at 3 and 4 respectively. These lights glow when cameras are used. They indicate the camera or cameras that are in use on the output line.

An amplifier 5 is provided for the output of camera 1 and an amplifier 6 is provided for the output of camera 2.

The electromagnetic relay 7 is provided for operating the switches 8 and 9, electromagnetic relay 10 for operating the switches 11, 12 and 13, and the electromagnetic relay 14 for operating the switches 15, 16, 17 and 18. These electromagnetically operated switches are biased to their upper positions when their respective electromagnetic relays are not energized.

The push button 19 is provided for operating the switches 20 and 21. Contact 20′ is provided for switch 20. The push button 22 is for operating the switches 23 and 24 and the push button 25 is for operating the switches 26 and 27. Leads 26′ and 27′ are provided for the switches 26 and 27.

The output of camera 1 is coupled by lead 30 and parallel condensers 31 and 32 to contact 35 of switch 11 and to switch 16. Resistors 33 and 34 extend from this lead 30 to ground on opposite sides of these condensers.

The output of camera 2 is coupled by lead 36 and parallel condensers 37 and 38 to contact 41 of switch 12 and resistors 39 and 40 are connected from lead 36 to ground on opposite sides of these condensers 37 and 38. The switch arm 12 is connected by lead 47, variable potentiometer 48 and condenser 49 to the control grid of the tube 6. Lead 50 connects switch 12 to the switch 17. Lead 51 connects lead 36 to the contact 52 of switch 17.

Leads 55 and 56 are from a source of power, which may be 110 volts. Lead 55 extends to contact 57 of switch 24 and lead 56 extends to solenoid 14. Lead 58 connects the other end of the solenoid 14 to contact 59 of switch 18 and lead 60 from contact 59 extends to the switch 27.

Lead 61 extends from the line 55 of the power line to switch 20 and contact 20′ of this switch is connected by lead 62 to switch 23. Lead 63 extends from the line 56 of the power line to the contact 64 of switch 21, and lead 65 extends from lead 63 to the contact 66 of switch 13.

Lead 67 extends from switch 21 to one end of solenoid 7, the other end of this solenoid being connected by lead 68 to a lead 69 which extends from power line 55 to contact 70 to switch 9. Lead 71 extends from lead 67 to the switch arm 13. Lead 75 extends from the switch 9 to the lead 73 which connects to the switch 24.

Lead 74 extends from contact 75 of switch 22 to the switch 18. Lead 76 extends from lead 73 to the lower end of solenoid 10, the other end of this solenoid being connected by lead 77 to the power line 56.

The indicating lights 3 and 4 are connected to one side of a source of low voltage and to contacts 78 and 79 of switch 8 respectively. Contact 78 is connected by lead 80 to the switch 15 and contact 79 is connected by lead 81 to the contact 82 of switch 15.

The resistors 85 and 86 are grid leaks for the tubes 5 and 6 respectively and the cathodes of these tubes are biased by resistors 87 and 88 respectively. The plates of tubes 5 and 6 are connected to a source of power through load resistor 88*a*, decoupling resistor 88*b* and inductance 89. A point between resistors 88*a* and 88*b* is coupled by capacitor 90 to ground. The connection from the source of power for tubes 5 and 6 to the plates of these tubes is shown at 91 and 92. The screen grids of these tubes are connected together by leads 94 and 95 and to a power source through resistor 93*a* and through capacitor 93 to ground. The suppressor grids of these tubes are connected in the usual way. A variable inductance coil 96 is located in the output of the tubes 5 and 6.

When the parts are in the positions shown in full lines in the drawing the camera 1 is ready for transmitting the video signal. The signal is carried from camera 1 by lead 30, contact 35, switch 11, lead 42, resistor 43 and condenser 44 to the control grid of amplifier 5. The output lead 91 is connected to coil 96 in the video output lead 97 and the signal may be further amplified in the usual way. It may also be fed to a monitor, not shown, when desired.

During this time line current flows from lead 55, through lead 69, lead 68, solenoid 7, lead 67, lead 71, switch 13, contact 66, lead 65, lead 63 to lead 56. This activates solenoid 7, pulling switch 8 down on contact 79. The indicating light 4 for camera 1 is lighted by current through it from one terminal of the source of current and through contact 79 and switch 8 to the other terminal of the source of current to show that camera 1 is operating.

When it is desired to transmit from camera 2 the button 22 is pushed down whereupon the switch 23 is opened and the switch 24 is closed. The circuit is thus closed from power line 55 through contact 57, switch 24, lead 73, lead 76, solenoid 10, lead 77, to power line 56. This energizes solenoid 10, thus opening switches 11 and 13 and closing switch 12. The closing of switch 12 establishes a video circuit from camera 2 through lead 36, contact 41, switch arm 12, lead 47, resistor 48 and condenser 49 to the control grid of amplifier 6. The output lead is connected to the coil 96 as described in connection with lead 91. This opening of switch 11 opens the circuit of the video output from camera 1. The opening of switch 13 opens the circuit of solenoid 7. This permits the bias spring of switch 8 to pull the arm 8 back up to the contact 78, putting indicator light 3 in the circuit to show that camera 2 is operating.

When it is intended for the camera 1 to be connected again, the push button switch 19 is pushed downward thus opening switch 20 and closing switch 21. This establishes a circuit from power line 56 through lead 63, contact 64, switch 21, lead 67, solenoid 7, leads 68 and 69 to power line 55. This energizes solenoid 7, thus opening switch 9 and causing current from power line 55, 56 to be cut off from solenoid 10, whereupon spring biased switches 11 and 13 close and switch 12 opens. This closing of switch 11 establishes a video circuit from camera 1 through lead 30, contact 35, switch 11, lead 42, resistor 43 and condenser 44 to the control grid of amplifier 5. The output lead is connected to coil 96 as described in connection with lead 91. This opening of switch 12 opens the circuit of the video output from camera 2.

Closing the circuit through solenoid 7 also causes the spring biased switch 8 to close on contact 79 thus again lighting the indicating light 4 of camera 1.

When it is desired to cause the signals of the cameras to overlap or to cause one to dissolve into the other the button 25 is pushed down. This establishes a circuit from power line 55 through lead 61, switch 20, lead 62, switch 23, contact 75, lead 74, contact 27', switch 27, lead 60, lead 58 and solenoid 14 to power line 56. This energization of solenoid 14 closes switches 15, 16, 17 and 18. This closing of switch 15 energizes both of the indicating lights 4 and 3 of the cameras 1 and 2. The circuit through the indicating light 4 of camera 1 from the 6.3 volts is from one side of the 60 cycle 6.3 volt source through switch 8, contact 78, lead 80, switch 15, contact 82, lead 81, through indicating light 4 to the other side of the 6.3 volts. The circuit through the indicating light 3 of camera 2 is completed through switch 8 and contact 78.

When the solenoid 14 is energized by pushing the button 25 as described above and with the switches 16 and 17 thereby closed by this solenoid, connections are established: from camera 1 to inductance 96 by lead 30, switch 16, contact 46, lead 45, lead 42, resistance 43 to the control grid of tube 5 and from plate of this tube by lead 91 to inductance 96: and from camera 2 to this same inductance by lead 36, lead 51, contact 52, switch 17, lead 50 and lead 47 to control grid of tube 6 and from the plate of this tube by lead 92 to inductance 96, thus mixing the signals from cameras 1 and 2.

Resistances 43 and 48 control the amount of video information from camera 1 and camera 2 respectively.

What is claimed is:

In a television signal switching device having two sources of television signal voltage, two amplifiers having separate input circuits and a common output circuit, and a pair of switches each of said switches being connected between a respective one of said sources and the input circuit of one of said amplifiers to connect said signals to the respective input circuits, said switches being interlocked to render one of said switches inoperative when the other of said switches is operated, separate means to connect both of said signal sources to the respective amplifiers at the same time, said means comprising a third switch having two pairs of contacts, said pairs of contacts being connected in parallel respectively with said pair of switches, an interlocking connection between said third switch and said pair of switches to allow only one of said switches to operate at a given time, and separate fader circuits for each of said amplifiers, said fader circuits being connected between the respective signal sources and the input circuits of said amplifiers to control the signal voltages applied thereto.

SALVATORE ROBERT PATREMIO.

REFERENCES CITED

The following references are of record in the file of this patent:

UNITED STATES PATENTS

| Number | Name | Date |
|---|---|---|
| 2,017,883 | Zworykin | Oct. 22, 1935 |
| 2,043,997 | Goldsmith | June 16, 1936 |
| 2,142,339 | Weaver | Jan. 3, 1939 |
| 2,146,512 | Phinney | Feb. 7, 1939 |
| 2,164,297 | Bedford | June 27, 1939 |
| 2,193,869 | Goldsmith | Mar. 19, 1940 |
| 2,286,540 | Hanson | June 16, 1942 |

OTHER REFERENCES

Proceedings I. R. E., vol. 29, pages 250 to 265, 1941.

"Television" by RCA Institute Press, vol. II, Oct. 1937, pages 181 to 187.

Proceedings I. R. E., vol. 29, No. 6, June 1941, pages 303 to 309.